United States Patent [19]

Kennedy

[11] Patent Number: 4,632,619
[45] Date of Patent: Dec. 30, 1986

[54] APPARATUS FOR UNROLLING BALED HAY

[76] Inventor: Frank W. Kennedy, P.O. Box 456, Cassville, Ga. 30123

[21] Appl. No.: 754,984

[22] Filed: Jul. 15, 1985

[51] Int. Cl.$^4$ .................................................. A01D 87/12
[52] U.S. Cl. .............................. 414/24.6; 180/53.61; 414/439; 414/781; 414/786
[58] Field of Search ................ 414/24.6, 439, 440, 414/442, 443, 705, 781, 786; 280/481, 760; 180/53.6, 53.61, 53.62, 221

[56] References Cited

U.S. PATENT DOCUMENTS

| | | | |
|---|---|---|---|
| 2,518,293 | 8/1950 | Anguera | 414/439 |
| 2,812,864 | 11/1957 | Martell | 414/781 |
| 3,022,902 | 2/1962 | Bartels | 414/781 |
| 3,336,041 | 8/1967 | Bouley | 280/43.23 |
| 3,779,208 | 12/1973 | Gay | 414/24.6 |
| 3,861,616 | 1/1975 | Dubberke | 414/24.6 |
| 3,948,399 | 4/1976 | Michaels | 414/781 |
| 4,413,940 | 11/1983 | Southard et al. | 414/24.6 |
| 4,544,176 | 10/1985 | Helmick | 280/481 |

*Primary Examiner*—Leslie J. Paperner
*Attorney, Agent, or Firm*—Newton, Hopkins & Ormsby

[57] ABSTRACT

An apparatus designed to facilitate the unrolling of baled hay has a main frame mounted onto a tractor or other vehicle. An upstanding arm attached to the frame carries a hydraulic cylinder and piston assembly, which assembly supports and selectively positions an axle and wheel. The axle is positioned so that the wheel contacts a tire of a vehicle. As the vehicle causes the tire to rotate, the wheel is also rotated but in the opposite direction from that of the tire. The wheel is driven by the vehicle against a rolled bale of hay. As the vehicle is driven, the wheel abuts the bale of hay and causes it to unroll.

14 Claims, 2 Drawing Figures

APPARATUS FOR UNROLLING BALED HAY

BACKGROUND OF THE INVENTION

1. Field of the Invention

The invention relates to an apparatus for unrolling baled hay and the like. Particularly this invention relates to an apparatus which is mounted preferably on the front of a vehicle, such as a tractor, and which utilizes the rotation of the tractor tire to unroll the bale of hay.

2. Description of the Prior Art

With the advent of large, rolled bales of hay instead of the smaller rectangular bales, various devices have been developed to facilitate the handling and transporting of the large, rolled bales. Specifically, as related to the present invention, the devices for unrolling baled hay developed to date have been constructed in various manners with a complex arrangement of elements which are interconnected to support either a drum or a set of wheels that are positioned to abut the bale of hay to unroll the bale. U.S. Pat. No. 4,413,940 to Southard et al. discloses such a device which utilizes a relatively complex, interconnected frame and lifting assembly that supports two wheels which are spaced and journaled by an axle. This type of rolled bale handler has no independent means to power the wheels, and as a result depends upon the forward movement of the tractor pushing the wheel against a bale of hay to impart rotational force to the wheel and the bale. In practicality, rolled bales become weathered or wet at their outer peripheries after being exposed to rain, snow, or sleet, and may become flat on the bottom and lose their tendency to unroll easily. An apparatus without powered wheels will often push the bales without unrolling them and thus do not function in a desirable manner. A bale handler which utilizes a complex interconnected support frame can further cause hay to become unceasingly entangled on the frame as the bale unrolls, possibly producing an undesirable result.

Another bale handling apparatus is disclosed by U.S. Pat. No. 3,779,208 issued to Gay. Gay discloses another relatively large frame, which supports a drum instead of wheels. Rotational force is imparted to the drum by a cog and chain arrangement. This arrangement can also provide a source for hay to become increasingly entangled during operation.

Other rolled bale handling devices include the following U.S. Pat. Nos.: 4,498,830 to Seymour et al.; 4,428,707 to Cockle et al.; 4,280,777 to Gray; and 3,861,616 to Dubberke. None of the known prior art discloses an apparatus for unrolling baled hay which is as simple in design and as efficient in operation as the present invention and which utilizes the direct contact between the tire of a vehicle and the driven wheel of the apparatus to impart rotational force to the driven wheel and ultimately to the bale.

SUMMARY OF THE INVENTION

Accordingly, one object of this invention is to provide a novel apparatus for unrolling bales which utilizes the rotational force of a tire of the vehicle supporting the apparatus to impart rotational force to a driven wheel of the apparatus and ultimately to the bale.

Another object of this invention is to provide a novel apparatus for unrolling baled hay which is constructed so as to substantially avoid entangling the material being unrolled.

Another object of this invention is to provide a novel apparatus for unrolling bales which imparts a lifting force to the bale as the bale is being unrolled.

Another object of this invention is to provide a novel apparatus for unrolling bales which can be selectively set at alternate operative positions by an operator.

Another object of this invention is to provide an apparatus for unrolling bales which can be selectively set in an inoperable position for traveling without removing the apparatus from the vehicle.

Another object of this invention is to provide an apparatus for unrolling bales which can be easily mounted and dismounted from the supporting vehicle.

Another object of this invention is to provide an apparatus for unrolling bales which is inexpensive to manufacture, durable in structure, and efficient in operation.

Other features and advantages of this invention will become apparent to those skilled in the art during the course of the following description.

In a preferred embodiment, the apparatus includes a support frame which is mounted onto the front of a vehicle, such as a tractor, by any commonly known means. Secured to the support frame, as by welding, and parallel to the longitudinal axis of the vehicle is a leg which supports an upstanding support arm. The support arm is securely attached to the outer end of the leg and is secured to the support frame by a brace member. Pivotally mounted to the lower end of the arm is an axle which pivots transversely to the longitudinal axis of the vehicle. A hydraulic cylinder and piston combination supports the axle in various operator-selected positions. The hydraulic cylinder is pivotally attached to the top of the arm and the piston is pivotally attached to a bracket welded to the inner, top midportion of the axle. Journaled on bearings at the outer end of the axle is a wheel upon which is mounted a pneumatic tire.

The arrangement of the apparatus is such that the hydraulic cylinder, which is ideally powered from a hydraulic motor and circuit of the vehicle, raises and lowers the axle to position the wheel at either an operative or inoperative position. In the operative position the wheel and tire journaled by the axle are positioned to contact the corresponding front tire of the vehicle. As the vehicle moves forward, the clockwise rotation of the vehicle's tire causes the tire and wheel of the apparatus to rotate in a counterclockwise direction. The operator positions the apparatus tire against a rolled bale and drives the vehicle forwardly into the bale. The counterclockwise rotation of the apparatus tire causes the bale to be lifted slightly and rotate clockwise, thereby unrolling the bale.

By actuating the hydraulic piston and cylinder assembly the axle can be raised into an inoperative position whereby the vehicle tire and the apparatus tire are no longer in contact.

DESCRIPTION OF THE PREFERRED EMBODIMENTS

Figure 1:
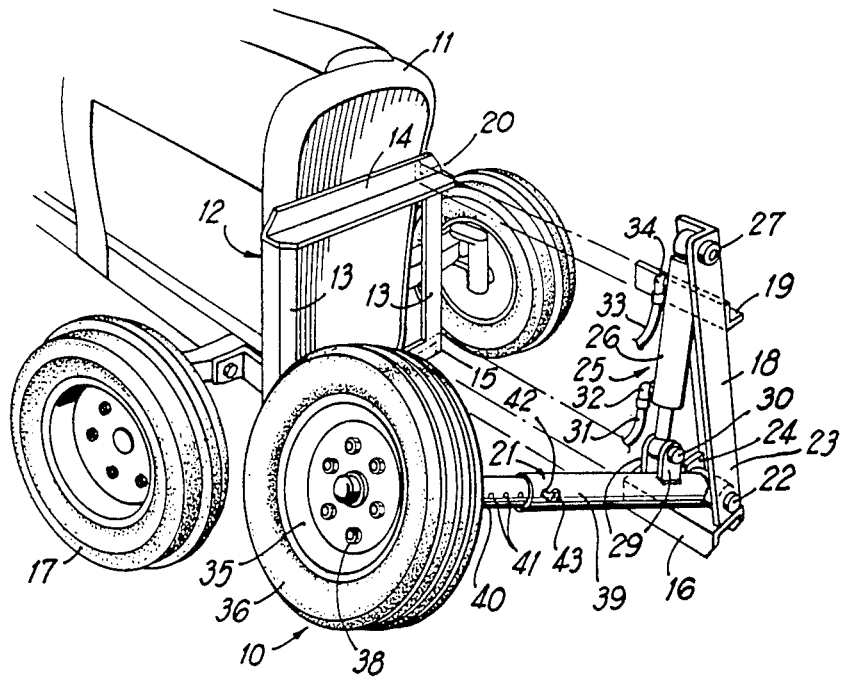
FIG. 1 is an exploded perspective view of the apparatus with the axle in an upwardly-tilted position.

Referring now to the drawings, wherein like reference numerals designate identical corresponding parts, the apparatus 10 is attached to a vehicle 11 by mounting the support frame 12 onto vehicle 11 by any commonly known means such as bolts and nuts or by welding (not shown). The support frame 12 is comprised of vertical members 13 and horizontal members 14 welded at their ends as shown in FIG. 1. Secured to one lower corner 15 of frame 12 is leg 16, shown in FIG. 1 by phantom lines as being detached from frame 12. Leg 16 is of a sufficient length so as to extend slightly beyond the most forward point of vehicle tire 17 so as to enable the apparatus to be placed into an operative position, as will be described later. Securely attached, preferably by welding, to the top of leg 16 at its outmost end, as shown in FIG. 1, is arm 18. Arm 18 is braced at its upper midportion by brace 19 which is welded at one end to arm 18 and at its other end to one upper corner 20 of frame 12. Therefore, brace 19 securely braces arm 18 in an upright position. Preferably, horizontal members 13 and vertical members 14 are angle irons, of various sizes, which aids in their assembly, are easily obtainable and are comparatively inexpensive in relation to other suitable materials. However, these elements can be of any material suitable for the requirements of this invention.

Axle 21 is pivotally mounted at its inner end by pin 22 between one side 23 of the lower end of arm 18 and upstanding bracket 24, which is welded to leg 16 and spaced away from side 23 of arm 18 a sufficient distance to enable the inner end of axle 21 to be received between side 23 and bracket 24. Axle 21 can therefore be pivoted transversely to the longitudinal axis of vehicle 11.

Preferably, axle 21 is comprised of two interfitting tubes to allow for adjustment as to length; as shown in FIG. 1, tube 39 telescopically receives tube 40. Tube 40 includes a series of holes 41, as shown in FIG. 1, passing through the circumference of tube 40. Tube 39 also includes a hole 42 passing through its circumference at its outer end-portion, so that a hole 41 can be aligned with hole 42, and pin 43 can be inserted therethrough to rigidly lock tubes 39 and 40 of axel 21 together. Therefore, axel 21 can be selectively adjusted as to length to fit different vehicles. This makes the apparatus 10 capable of being readily usable on different vehicles.

A hydraulic piston and cylinder assembly 25 is adapted to raise and lower the axle 21. The cylinder 26 of assembly 25 is pivotally attached to the upper end of arm 18 by pin 27. The piston 28 of assembly 25 is pivotally attached to spaced brackets 29 by pin 30. The spaced brackets 29 are welded to the top, inner midportion of axle 21 and are spaced from each other sufficiently to allow piston 28 to be received therebetween as shown in FIG. 1. Hydraulic piston and cylinder assembly 25 is actuated by hydraulic fluid entering assembly 25 through intake hose 31 which is attached to cylinder 26 by fitting 32. Hydraulic fluid is bled out of cylinder 25 through exit hose 33, which is attached to cylinder 26 by fitting 34. Intake hose 31 and exit hose 33 are connected to any suitable hydraulic motor and circuit (not shown). Preferably the hydraulic motor and circuit are integral elements of vehicle 11, such as is the common situation with farm vehicles. However, any suitable hydraulic motor and circuit, driven by any suitable vehicle will of course satisfy the requirements of this invention.

Journaled at the outer end of axle 21 by bearings (not shown) or any other suitable means is wheel 35. Wheel 35 is mounted onto axle 21 by any commonly known means, which means for mounting wheel 35 onto axle 21 is not in and of itself a part of this invention. A tire 36 is mounted onto wheel 35. This tire 36 is preferably wide to maximize the area of contact with bale 37, and is also preferably slick or lacking deep tread such as a used or worn tire. This reduces the occurrence of hay becoming entangled on the tread as the bale 37 is unrolled. Further, tire 36 preferably has a smooth hubcap (not shown) mounted over attachment means 38 in order to reduce the chance of hay becoming entangled on the attachment means when the bale 37 is unrolled.

Figure 2:
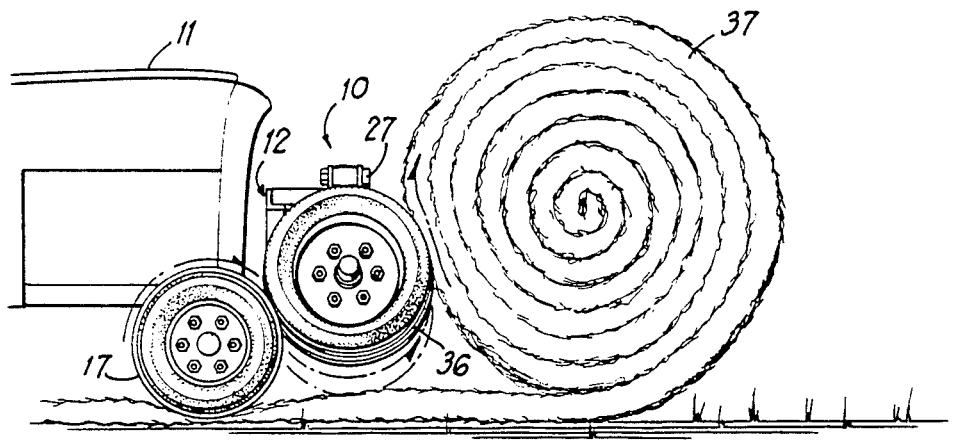
FIG. 2 is a side elevational view of the apparatus in an operative position unrolling a bale.

Therefore, as is seen in FIG. 1, as hydraulic fluid is pumped into or bled out of assembly 25, piston 28 is extended from or retracted into cylinder 26, respectively. This causes axle 21 to be raised or lowered in transverse relationship to the longitudinal axis of vehicle 11. Tire 36 is selectively positioned to contact tire 17 as shown in FIG. 2 Vehicle 11 is aligned with bale 37 so that tire 36 contacts bale 37, also as shown in FIG. 2. As vehicle 11 is driven towards and into bale 37, the clockwise rotation of tire 17 causes tire 36 to rotate counterclockwise. Tire 36 in turn causes bale 37 to rotate clockwise, thus unrolling bale 37. The rotational force of tire 36 also tends to lift bale 37 slightly as it causes bale 37 to unroll. This added advantage of apparatus 10 aids in unrolling bales which have become damp due to weathering and flattened somewhat, which causes rolled bales of hay to be more difficult to unroll. Further, the operator of vehicle 11 can position wheel 37 at any point along the axis of bale 37 and guide bale 37 in selected directions as the bale unrolls.

Obviously, numerous modifications and variations of the present invention are possible in light of the above teachings. It is therefore to be understood that within the scope of the appended claims, the invention may be practiced otherwise than as specifically described herein.

I claim:

1. An apparatus for unrolling baled hay which is mounted onto a vehicle having tires and which utilizes the rotation of one tire of the vehicle to unroll the baled hay, comprising:
   a. a support frame;
   b. means for mounting said support frame onto a vehicle;
   c. an axle pivotally attached at one end in a substantially parallel relationship to said frame and having a journal means at its other end;
   d. a support arm mounted onto said frame for supporting said axle;
   e. a single wheel mounted onto said journal means; and
   f. adjustment means for raising and lowering said wheel and said axle whereby said wheel can be selectively positioned to contact said tire of said vehicle so that the rotation of said tire causes said wheel to rotate in the opposite rotational direction of said tire, said wheel contacting and unrolling the baled hay.

2. The apparatus for unrolling baled hay of claim 1, wherein said means for raising and lowering said wheel and said axle is comprised of a hydraulic cylinder and piston combination.

3. The apparatus for unrolling baled hay of claim 2, wherein said hydraulic cylinder and piston combination is powered by said vehicle.

4. The apparatus for unrolling baled hay of claim 1, wherein the pivotal movement of said axle allows said wheel to be selectively positioned at a plurality of operative positions.

5. The apparatus for unrolling baled hay of claim 1, wherein said pivotal movement allows said wheel to be selectively positioned to contact said tire at various points of contact.

6. The apparatus for unrolling baled hay of claim 1, wherein said frame is comprised of angle irons having opposed ends, whereby said angle irons are welded at said ends.

7. The apparatus for unrolling baled hay of claim 1, wherein said wheel is comprised of a pneumatic tire.

8. The apparatus for unrolling baled hay of claim 7, wherein said tire has a wide, slick contact surface thereon.

9. The apparatus for unrolling baled hay of claim 1, wherein said support arm includes a bracket for pivotally mounting said hydraulic cylinder to said support arm.

10. The apparatus for unrolling baled hay of claim 1, wherein said axle includes means to journal said wheel, and a bracket for pivotally mounting said piston of said hydraulic cylinder to said axle.

11. The apparatus for unrolling baled hay of claim 1, wherein said apparatus can be selectively adjusted for operation with different vehicles.

12. The apparatus for unrolling based hay of claim 1, wherein said axle is comprised of telescoping tubes which can be selectively positioned to enable said apparatus to be operable with different vehicles.

13. An apparatus for unrolling baled hay which is mounted onto a vehicle having tires and a longitudinal axis, comprising a support frame mounted onto one end of said vehicle transversely to said longitudinal axis, a leg attached to said support frame, an upstanding support arm mounted to said leg, an axle pivotally mounted to said support arm at one end in substantially parallel relationship to said support frame and having journal means at its other end, a single wheel mounted onto said journal means, a hydraulic cylinder and piston combination pivotally attached at one end to said support arm and at its other end to said axle whereby said axle is selectively raised and lowered by said hydraulic cylinder to a position whereby said wheel contacts a tire and the rotation of said tire causes said wheel to rotate in the opposite rotational direction of said tire said wheel contacting and unrolling the baled hay.

14. A method for unrolling baled hay comprising the steps of:
providing a vehicle having tires with a support frame;
mounting onto said support frame a single rotatable wheel;
providing an adjustment means for raising and lowering said single wheel to selected positions relative to one of the tires of said vehicle;
bringing said single wheel into contact with said tire;
driving said vehicle in a forward direction so that the rotation of said tire causes said wheel to rotate in the opposite rotational direction of said tire; and
unrolling the baled hay by bringing the rotating wheel into contact with the hay while driving the vehicle forward.

* * * * *